Figure 1:
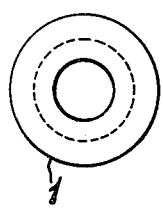

Sept. 18, 1956            E. G. REDIN            2,763,017
DEVICE FOR CLEANING MILK CONDUITS
OF MACHINE MILKING PLANTS
Filed March 16, 1953

Inventor:
Eric Georg Redin
by W. Bayard Jones
Attorney

United States Patent Office 2,763,017
Patented Sept. 18, 1956

2,763,017

DEVICE FOR CLEANING MILK CONDUITS OF MACHINE MILKING PLANTS

Eric Georg Redin, Norrkoping, Sweden, assignor to Aktiebolaget Manus, Norrkoping, Sweden, a Swedish company Application March 16, 1953, Serial No. 342,317

1 Claim. (Cl. 15—104.06)

In machine milking plants in which the milk is conducted from the teat cup units through a milk conduit, or several milk conduits, to the milk chamber, it is necessary thoroughly to clean the milk conduit after each milking operation. Heretofore, it has been common practice to perform the cleaning operation by first drawing cold water by suction through the entire milk conduit system and then flushing the system a second time with hot water. The entire milk conduit system is then filled with a chloramine solution which is allowed to remain in the system until the next milking operation is to take place, when the chloramine solution is emptied from the system which is then flushed with clean water. It has been observed, however, that in spite of these flushing operations it may happen that deposits are formed in the conduit, particularly if it contains dips or depressed portions, and that such deposits can give rise to colonies of bacteria.

The object of the present invention is to provide a device for cleaning milk conduits of the kind above stated in such manner as to prevent the formation of such deposits in the conduit.

For cleaning conduits for liquids it has been proposed to use a substantially cylindrical body made of an elastic material and the outside diameter of which corresponds substantially to the inside diameter of the conduit, said body being intended to be introduced into the conduit and to be caused to move through the conduit by the influence of an overpressure or a vacuum acting upon one end of the body. Hitherto proposed devices of this kind, however, are not suitable for use for cleaning milk conduits for the reason that they are not sufficiently efficient to produce a thorough cleaning of a milk conduit, or else they are not suited to this purpose for the reason, for example, that they are apt to stick in the milk conduit if they are introduced into the conduit with the wrong end first.

The device according to the present invention which consists of a substantially cylindrical body made of an elastic material, such as rubber or the like, is characterized by the body being provided with a plurality of peripheral grooves extending around the circumference of the body and which form plane flanges extending perpendicularly to the axis of the body, the outer diameter of said flanges being equal to or somewhat larger than the inside diameter of the milk conduit.

This construction of the body according to the invention provides the advantage that the plane flanges formed between the peripheral grooves obtain an increased elasticity and an enhanced capability to adapt themselves to the inner surface of the conduit. For this reason the flanges can be given a somewhat larger outer diameter than the inside diameter of the conduit. As a result hereof, and also because the body obtains a considerably increased number of scraping edges due to the said flanges, the scraping action against the inside surface of the conduit is increased. In addition, the risk of dirt being pressed into the rubber of which the body is made, is avoided, since any solid particles which perchance are not pushed in front of the body, will not get stuck and cling to the rubber flanges, but will be collected in the grooves between the flanges. Due to the body being provided with elastic and resilient flanges it will slide very easily through the conduit, and since the flanges of the body are plane and perpendicular to the axis thereof a further and essential advantage is attained, viz. that the body may be inserted in the conduit with either of its ends first, without risk of the body jamming against the wall of the conduit in such manner that it cannot be propelled by the vacuum in the conduit.

Figure 2:
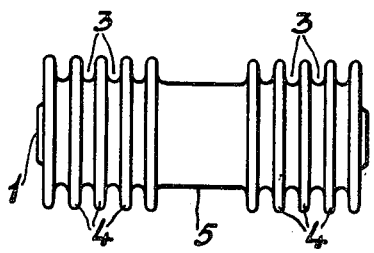
Figure 3:
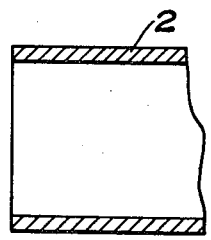
Figure 4:
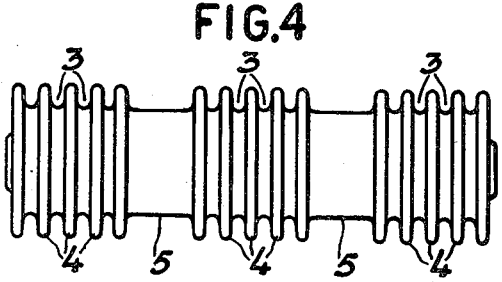

Two constructional forms of a device according to the invention are illustrated in the accompanying drawing. Fig. 1 shows an end view of one constructional form of the device, and Fig. 2 shows a side view thereof. Fig. 3 represents an axial section of the end of a milk conduit. Fig. 4 shows a side view of the second constructional form.

Referring to Figs. 1 and 2 of the drawing, 1 denotes the body or plug that is intended to be inserted in, and to be caused to pass through, the milk conduit which is represented in Fig. 3 of the drawing by the end of the pipe 2 shown in axial section. The body 1 is made of an elastic material, such as rubber or the like, and has a substantially cylindrical shape. Adjacent both of its ends the body 1 is provided with peripheral grooves 3 extending circumferentially around the body and which form comparatively thin flanges or lips 4. The outer diameter of said flanges 4 can suitably be slightly larger than the inside diameter of the tube or conduit 2. As a result hereof and owing to the flexibility and elasticity of the flanges they will adhere closely to the inner surface of the conduit. In the instance illustrated, the portion 5 of the body 1 midway of its length has a smaller outer diameter than the rest of the body. This arrangement provides for increased flexibility of the body so that it can easily pass bends in the milk conduit. It will be understood that the body 1 may be provided with more than one such portion of a reduced outer diameter dividing the body into more than two portions having an outer diameter corresponding to the inner diameter of the milk conduit. By way of illustration, Fig. 4 shows a constructional form of a body having two portions 5 of a reduced outer diameter positioned between a middle portion and two end portions each of which is provided with grooves 3 and flanges 4 in the manner above described in connection with Figs. 1 and 2.

With the aid of the device according to this invention the cleaning of a milk conduit becomes very simple. After opening one end of the milk conduit 2 the body 1 is inserted therein, after which vacuum is applied to the other end of the conduit. Practical tests have proved that the body is easily pulled by the vacuum through the milk conduit, and that it easily passes through bends in the conduit and even through joints in the same, and further, that the body efficiently carries along any dirt and impurities that may have entered the conduit and also any liquid that may remain therein. If deemed desirable the conduit may, of course, first be flushed with cold water or hot water, and after the body has been caused to pass through the conduit, the latter may be filled with a chloramine solution, if desired.

I claim:

A device for cleaning milk conduits of machine milking plants consisting of a solid integral body entirely made of an elastic non-porous material, said body comprising a cylindrical core part having two end portions and an intermediate portion all of substantially uniform diameter and of substantial length, said end portions being provided with circular plane integral flanges perpendicular to the axis of said core, said flanges being deformable so that said plug can be inserted into a conduit having an inner diameter slightly less than the outer diameter of said flanges, and said flanges being of such number as to compensate for their lack of stiffness, said flanges being spaced from each other by a distance substantially equal to the thickness of each flange so as to impart a uniform radial stress to the end portions of said core part for the purpose of flexing the same when said plug is passing through bends in said conduit and so that the axis of said core part will be maintained in substantially centered position with respect to said conduit, said intermediate portion being of substantially uniform diameter with respect to said end portions so that a substantially uniform degree of flexure will obtain in all of said portions of said core part.

References Cited in the file of this patent

UNITED STATES PATENTS

| | | |
|---|---|---|
| 566,041 | Warner | Aug. 18, 1896 |
| 2,188,959 | Schaer | Feb. 6, 1940 |
| 2,276,109 | Smith | Mar. 10, 1942 |
| 2,544,290 | Bailey | Mar. 6, 1951 |
| 2,603,830 | Barker | July 22, 1952 |

FOREIGN PATENTS

| | | |
|---|---|---|
| 205,352 | Switzerland | Sept. 1, 1939 |